Feb. 5, 1952   F. REINGRUBER ET AL   2,584,924
THERMOSTAT
Original Filed March 20, 1943   2 SHEETS—SHEET 2
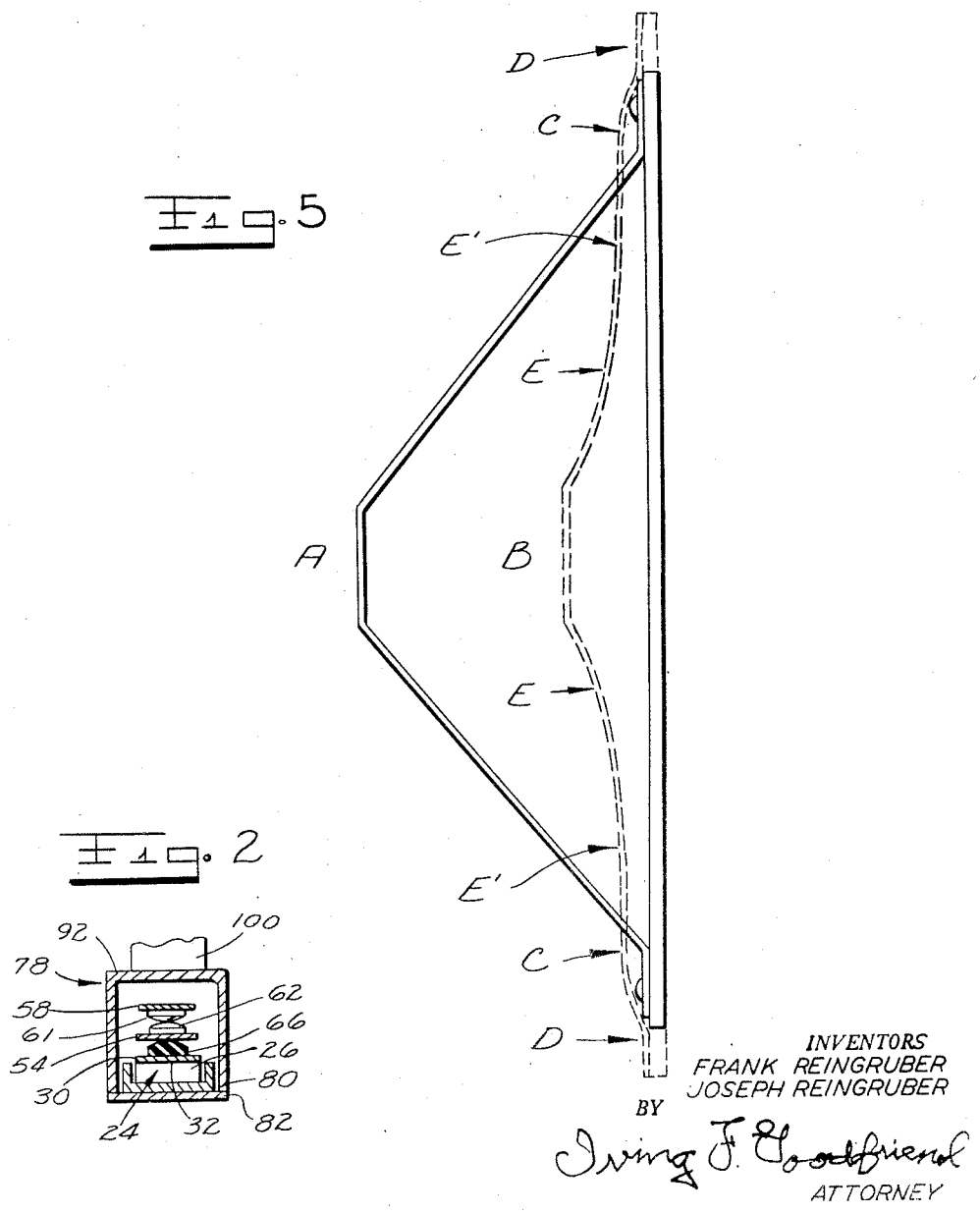
INVENTORS
FRANK REINGRUBER
JOSEPH REINGRUBER
BY
Irving F. Goodfriend
ATTORNEY Patented Feb. 5, 1952

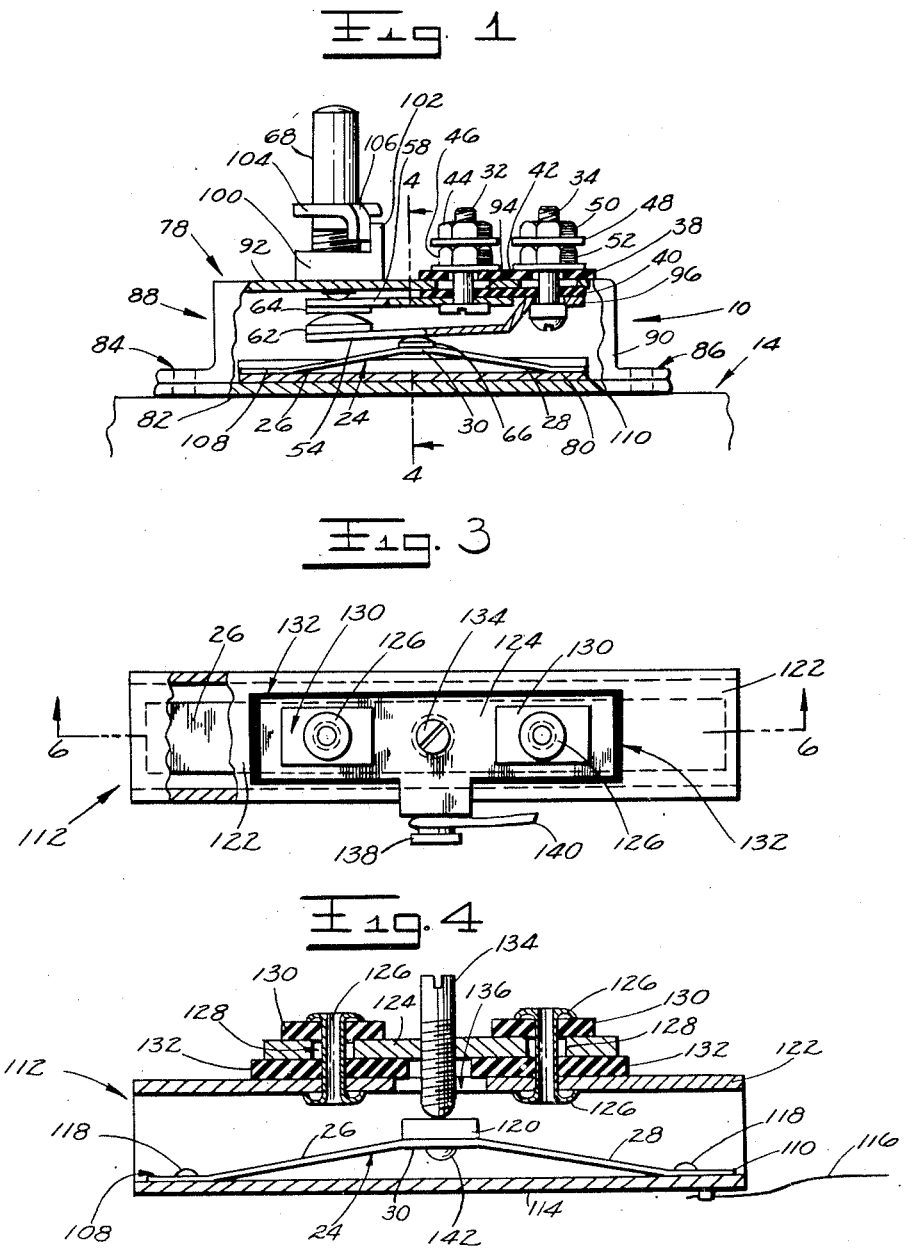

2,584,924

UNITED STATES PATENT OFFICE 2,584,924

THERMOSTAT

Frank Reingruber and Joseph Reingruber,
New York, N. Y.

Original application March 20, 1943, Serial No. 479,860. Divided and this application October 26, 1945, Serial No. 624,674

6 Claims. (Cl. 200—137)

1

This invention relates to thermostats and more particularly to that type in which is employed two metals of dissimilar heat expansion characteristic to actuate a control, whether an electric switch, relay, valve or the like and is a division of our application Ser. No. 479,860, Patent No. 2,389,686 of November 27, 1945, for Thermostat.

Our invention contemplates the provision of a comparatively sensitive thermostat so designed and constructed that the relatively small movement of the expanding metal is translated into a larger, multiplied or magnified movement of the control operating element and therefore provides a thermostat that reacts rapidly to relatively small changes in temperature.

Our invention further contemplates a thermostat of such construction that it may be readily applied in direct contact with the device to the temperature of which the thermostat is designed to react, and thereby one adapted to quickly react to relatively small changes in temperature thereof, thereby increasing the sensitivity of regulation and limiting the tendency of the device to overshoot the temperature for which the thermostat is set.

Our invention still further contemplates the provision of a thermostat which is simple and rugged in construction, self contained in a casing that may be conveniently applied as a unit to the article, the temperature of which is to be regulated.

Our invention also contemplates the provision of such a thermostatic unit that is relatively small in size and compact, reliable in operation and readily adjustable.

Other and further objects and advantages of the present invention and the uses to which it may be put as well as the devices to which it may be applied will be clear from the description which follows and the drawings appended thereto, in which drawings, throughout all the figures thereof like reference characters are used to designate similar parts and in which Fig. 1 is a side elevation of a thermostat unit according to our invention, broken away and in partial section to show the relative arrangement of the parts Fig. 2 is a section on the line 4—4 of Fig. 1

Fig. 3 is a part sectional plan view of a modification of our invention

Fig. 4 is a section on the line 6—6 of Fig. 3

Fig. 5 is an exaggerated schematic illustration of the expansion characteristics of the temperature responsive mechanism, according to our invention.

2

Referring now to the drawings, we have there illustrated a thermostat which is mounted in and completely enclosed in a housing or casing 78, which, as a unit, may be secured in any suitable manner to a surface 14 of the device, the temperature of which is to be regulated (Figs. 1 and 2).

In a modification here illustrated, the control operating member 24, which is flexed by the expansion of the linearly expanding member, is secured at the ends of its legs 26 and 28, preferably as by spot welding, to the linearly expansible channel bar 80, thereby dispensing with the abutments 20 and 22, illustrated in Fig. 1 of our copending application Ser. No. 479,860, Patent No. 2,389,686, although it will be understood that such abutments for holding the member 24 may be formed integrally in the bar.

The modification of our invention, which is the subject matter of the present application, operates substantially the same as that illustrated in our said copending application, except that the member 24 is collapsed or flexed by the outward pull on the toes 108 and 110 imposed thereon by the expansion of the bar 80, to which they have been secured, to thereby separate the legs and lower the centre portion of the member, which opens the switch means.

The member 24 in the embodiment illustrated in Figs. 1 and 2 of this application has at the end of its legs 26 and 28, a sharp bend which forms the toes 108 and 110.

As a result of this additional bend, the legs 26 and 28 will flex or curve concavedly adjacent the platform element 30 and curve convexedly upward at the toe ends as illustrated respectively at E and E' by the broken lines of Fig. 5.

This further adds to the magnitude of the downward movement of the platform element 30 for a given expansion of the bar 12 or 80 making the thermostat still more sensitive.

The interior of the housing or casing 78 is closed by the base plate 82, at one point of which, preferably the centre, the bar 80 is secured, as by spot welding.

The bar 80 is therefore free to expand from its centre at the ends to operatively pull the legs 26 and 28 apart.

The base plate 82, is secured to the flanges 84 and 86, extending from the end walls 88 and 90 of the housing or casing 78, in any suitable manner.

The terminal posts 32 and 34 are mounted on the top wall 92 of the box-like inclosure or housing 78, which has the openings 94 and 96 through which the posts extend.

The posts are insulated from the top wall and each other by the mica sheets 38 and 40.

The tension member 54 presses downwardly and rides against the insulating button 66 on the platform-like element 30 of the control operating member 24.

The calibrating member 68 may be mounted in the tapped collar 100, on the top wall 92, which is suitably drilled so that an end of the calibrating member 68 may enter the interior of the housing against the switch element 58 to selectively position it.

The collar 100 may be provided with the projecting stop 102 and the member 68 with a fixed washer 104 having the lug 106, which cooperates with the stop 102 to limit the adjustment of the member 68 over a desired range.

Upon contraction of the bar 80, as it cools, the member 24 is positively returned to its normal switch means closing position and shape.

Referring now to Figs. 3 and 4, we have there illustrated a modification of our invention which is particularly adapted for use with a low temperature device, such as an electric heating pad.

In this modification the parts of the thermostat are housed in the casing 112, which itself serves as one electrode and therefore has secured to one side 114 thereof the lead wire 116.

The housing or casing 112 constitutes the heat expanding member of this modification and is formed from a hollow bar, tube or rod of material having a relatively high coefficient of expansion.

The legs 26 of the flexible or collapsible member 24 are secured in the interior of the casing 112, as by welds 118, at the toes 108 and 110 thereof to the inside surface of wall 114, Fig. 4.

The member 24, as pointed out has a relatively low coefficient of expansion and is made of metal which is an electrical conductor, such as spring steel, and has secured to the platform-like element 30 at its midpoint, the electrical contact 120, which serves as the movable terminal of the switch means.

On the exterior of the casing 112, at an opposite wall 122, we secure the contact bracket 124, by any suitable means such as the staples 126, which extend into the openings 128 in the contact bracket 124 and are peened over the insulating washers 130 to grip the various parts in place.

The contact bracket 124 is insulated from the casing 112, by the mica sheets 130 and 132, held in place by the staples 126.

The contact bracket 124 is provided with a tapped aperture in which the calibrating screw 134, constituting the other fixed terminal of the switch means, is received so that it extends through the opening 136, in the wall 122, in contact with and against the electrical contact 120.

Extending from the bracket 124, as an integral part thereof, we provide the terminal binding post 138 to which the lead wire 140 is secured.

The electrical circuit is therefore from the source (not shown) through the lead wire 116, the casing 112, contact 120, calibrating screw 134, bracket binding post 138 and through the lead wire 140 to the source.

The electrical contact 120, which is pulled away from the calibrating screw 134 upon heat expansion of the casing 112, returning in contact therewith upon contraction of the casing, constitutes together with the screw 134 the make and break switch which is controlled by the expanding and positively moved members of the temperature responsive mechanism.

The embodiment illustrated in Figs. 3 and 4 operates substantially the same as the other heretofore described embodiments except that the expanding member constitutes the casing and the flexed member constitutes with the calibrating member the make and break switch.

The relative dimensions of the various elements of the temperature responsive mechanism used with our invention will vary in practice.

The platform is preferably considerably smaller than the two legs and the angle where they meet it or each other the toes should not be rounded but relatively sharp as illustrated, which construction we have found results in the relatively large downward movement sought at the centre of the spaced member for a given expansion of the other member and the concavo-convex flexing of the legs, which also adds to accomplishment of this result.

It will be seen that we have provided a sensitive thermostat in which a relatively small linear movement of a heat expanded member is translated into a comparatively greater, multiplied or magnified movement of the member controlling the operation of the device.

It is further apparent that we have provided a thermostat in which the temperature responsive mechanism comprises a member that readily expands or contracts under the influence of changes in temperature to flex a second member which is spaced from it except at its ends, to thereby operate a control.

It is still further apparent that we have provided a simple, rugged, self-contained, compact and relatively small thermostat that is reliable in operation and readily adjustable.

While we have illustrated specific embodiments of our invention, we do not intend to be limited to the specific details shown, but intend to claim our invention as broadly as the prior art and the scope of the appended claims permit.

We claim:

1. In a thermostat, a housing, a base plate closing the interior of the housing, a bar having a relatively high coefficient of expansion secured at one point to the base plate and free to expand from said point, a member at the centre thereof spaced away from the bar and having a relatively low coefficient of expansion, said member bent to form a platform at the centre thereof and a normally straight leg at each side extending down from the platform at an angle thereto, each leg of equal length and secured at its end to the bar and normally unbent between the platform and its connection to the bar, a make and break switch comprising two tensioned elements, a pair of terminal electrodes on the housing, one of said elements secured to one electrode and tensioned against the platform and a calibrating member on the housing, the other of said elements secured to the other of said electrodes and tensioned against said calibrating member, each leg, upon expansion of the bar, being bent concavedly downward toward the bar whereby the platform is moved downward in a straight line toward the said bar.

2. In a thermostat, an enclosing housing, a heat expansible and contractible bar, a relatively heat non-expansible and contractible member bent to form a flexible element having a platform and a leg extending in a straight line from each side thereof at an angle thereto down to the bar, said legs each of equal length and secured to the bar at the ends thereof and unbent between the platform and its connection to the bar and a make and break switch comprising two separable arms, one of said arms tensioned against the platform, each leg, upon expansion of the expansible and contractible member, being bent concavedly downward toward the said expansible and contractible member whereby the platform is moved downward in a straight line toward the said last mentioned member.

3. In a thermostat, an enclosing housing open at the bottom thereof, a temperature responsive mechanism comprising a rigid linearly heat expanding and contracting channel bar having a relatively high coefficient of expansion, a base bar, said channel bar secured at one point to the base bar, said base bar closing the opening to the housing, and a spring element in the housing having a relatively low coefficient of expansion and spaced from the channel bar at its centre and bent thereat to form a platform and legs diverging therefrom in an unbent straight line to the channel bar each leg equal in length, a toe at the end of each leg secured to the channel bar, each leg, upon expansion of the member, bent concavedly downward between the platform and the toe toward the member and concavedly upward from the member at the toe whereby the platform is moved downward in a straight line toward the member.

4. In a thermostat, a rectangular housing open at the bottom, a temperature responsive mechanism comprising a rigid linearly heat expanding and contracting member having a relatively high coefficient of expansion and closing the opening at the bottom of the housing and a spring element completely enclosed in the housing having a relatively low coefficient of expansion and spaced from the member at its centre and bent thereat to form a platform and normally straight legs diverging therefrom to the member, each leg equal in length, the end of each leg movable with the member upon the expansion and contraction thereof, each leg, upon expansion of the member, being bent concavedly downward toward the member between the platform and the end of each leg whereby the platform is moved downward in a straight line toward the member and switch means controlled by the spring element for opening and closing of the switch upon expansion and contraction of the member.

5. In a thermostat, an enclosing housing, a heat expansible and contractible first member, a second member having a relatively low coefficient of expansion, said second member bent to form a flexible element having a platform and a leg extending in a straight line from each side of the platform at an angle thereto down to the first member, said legs each of equal length and secured to the first member at the ends thereof and unbent between the said platform and the connection of the leg to the first member, and a make and break switch having an element tensioned against the platform, each leg upon expansion of the first member, being bent concavedly downward toward the first member whereby the platform is moved downward in a straight line toward said first member to actuate said make and break switch.

6. In a thermostat, an enclosing housing, a heat expansible and contractible first member, a second member having a relatively low coefficient of expansion, said second member bent to form a flexible element having a platform and a leg extending in a straight line from each side of the platform at an angle thereto down to the first member, said legs each of equal length and secured to the first member at the ends thereof and unbent between the said platform and the connection of the leg to the first member, and a mechanism tensioned against the platform and controlled thereby, each leg upon expansion of the first member, being bent concavedly downward toward the first member whereby the platform is moved downward in a straight line toward said first member to actuate said mechanism.

FRANK REINGRUBER.
JOSEPH REINGRUBER.

REFERENCES CITED

The following references are of record in the file of this patent:

UNITED STATES PATENTS

| Number | Name | Date |
| --- | --- | --- |
| 1,435,096 | Amelianovich | Nov. 7, 1922 |
| 2,058,325 | Labbe | Oct. 20, 1936 |
| 2,197,276 | Mulvany | Apr. 16, 1940 |
| 2,217,328 | Barnes | Oct. 8, 1940 |
| 2,248,666 | Fischer | July 8, 1941 |
| 2,287,177 | Joesting | June 23, 1942 |